United States Patent
Huh et al.

(10) Patent No.: US 9,555,699 B2
(45) Date of Patent: Jan. 31, 2017

(54) POWER TRANSMISSION APPARATUS FOR HYBRID ELECTRIC VEHICLE

(71) Applicant: Hyundai Motor Company, Seoul (KR)

(72) Inventors: Junhoi Huh, Hanam-si (KR); Kwangmin Choi, Seoul (KR); Taesic Park, Busan (KR); Baekyu Kim, Suwon-si (KR); Seongeun Park, Gwangmyeong-si (KR); Chulmin Ahn, Busan (KR); Sunggon Byun, Anyang-si (KR); Kumlim Choi, Seoul (KR); Keunseok Lee, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 86 days.

(21) Appl. No.: 14/555,174

(22) Filed: Nov. 26, 2014

(65) Prior Publication Data

US 2016/0082822 A1   Mar. 24, 2016

(30) Foreign Application Priority Data

Sep. 23, 2014 (KR) ........................ 10-2014-0126792

(51) Int. Cl.

| F16H 3/08 | (2006.01) |
|---|---|
| B60K 6/36 | (2007.10) |
| B60K 6/547 | (2007.10) |
| B60K 6/387 | (2007.10) |
| B60K 6/48 | (2007.10) |
| F16H 3/00 | (2006.01) |
| F16H 3/093 | (2006.01) |

(52) U.S. Cl.
CPC ................ B60K 6/36 (2013.01); B60K 6/387 (2013.01); B60K 6/48 (2013.01); B60K 6/547 (2013.01);

(Continued)

(58) Field of Classification Search
CPC .. F16H 3/006; F16H 2003/0931; F16H 3/091; F16H 47/02

(Continued)

(56) References Cited

U.S. PATENT DOCUMENTS 6,634,986 B2 * 10/2003 Kima ..................... B60K 6/365
                                                                        475/5
7,383,749 B2    6/2008 Schäfer et al.

(Continued)

FOREIGN PATENT DOCUMENTS

JP        4361794 B2    11/2009
JP        4566199 B2    10/2010

(Continued)

*Primary Examiner* — Ha D Ho
(74) *Attorney, Agent, or Firm* — Morgan, Lewis & Bockius LLP (57) ABSTRACT

A transmission for a vehicle may include first and second input shafts, first and second shifting output units, a reverse speed idle unit and an electric driving force unit. Each input shaft may include a plurality of input gears having different numbers of gear teeth. The second input shaft may be hollow and disposed at a front side of the first input shaft without any rotational interference with the first input shaft. Each shifting output unit may include an output shaft, shift rotational driving force transferred through shifting gears selectively outer-engaging with corresponding input gears by a synchronizing unit and output the shifted rotational driving force through an output gear. The reverse speed idle unit may regulate reverse speed shifting. The electric driving force unit may selectively transfer rotational driving force of a motor/generator to the first input shaft or the second shifting output unit.

14 Claims, 2 Drawing Sheets (52) U.S. Cl.
CPC ....... *F16H 3/006* (2013.01); *B60K 2006/4808* (2013.01); *B60K 2006/4825* (2013.01); *F16H 2003/0931* (2013.01); *F16H 2200/0056* (2013.01); *Y10S 903/909* (2013.01); *Y10S 903/912* (2013.01); *Y10S 903/919* (2013.01)

(58) Field of Classification Search
USPC .................................. 74/330, 331, 333, 340
See application file for complete search history.

(56) References Cited

U.S. PATENT DOCUMENTS

| | | | |
|---|---|---|---|
| 7,462,121 B2* | 12/2008 | Janson | B60K 6/387 475/214 |
| 8,297,141 B2* | 10/2012 | Cimatti | B60K 6/48 74/330 |
| 8,517,876 B2* | 8/2013 | Sakai | B60K 6/387 475/5 |
| 8,622,862 B2* | 1/2014 | Koyama | B60K 6/36 180/65.21 |
| 2008/0194369 A1* | 8/2008 | Boutou | B60K 6/365 475/5 |

FOREIGN PATENT DOCUMENTS

| | | |
|---|---|---|
| JP | 2010-285012 A | 12/2010 |
| KR | 10-1181746 B1 | 9/2012 |
| KR | 10-2014-0059917 A | 5/2014 |
| KR | 10-2014-0068676 A | 6/2014 |

* cited by examiner

| Shifting gears | CL1 | CL2 | SL5 EVIG | SL1 IS1 | 1st | 5th | SL2 2nd | 4th | SL3 3rd | 7th | SL4 6th | R | Remarks |
|---|---|---|---|---|---|---|---|---|---|---|---|---|---|
| Rearward drive |  | ● |  |  |  |  |  |  |  |  |  | ● | Engine driving |
| Neutral |  |  |  |  | ● |  |  |  |  |  |  |  |  |
| 1-speed | ● |  |  |  | ● |  |  |  |  |  |  |  |  |
| 2-speed |  | ● |  |  |  |  | ● |  |  |  |  |  |  |
| 3-speed | ● |  |  |  |  |  |  |  | ● |  |  |  |  |
| 4-speed |  | ● |  |  |  |  |  | ● |  |  |  |  |  |
| 5-speed | ● |  |  |  |  | ● |  |  |  |  |  |  |  |
| 6-speed |  | ● |  |  |  |  |  |  |  |  | ● |  |  |
| 7-speed | ● |  |  |  |  |  |  |  |  | ● |  |  |  |
| HEV 1-speed | ● |  |  | ● | ● |  |  |  |  |  |  |  | Engine driving Motor driving |
| HEV 2-speed | ● |  |  | ● |  |  |  |  | ● |  |  |  |  |
| HEV 3-speed | ● |  |  | ● |  | ● |  |  |  |  |  |  |  |
| HEV 4-speed | ● |  |  | ● |  |  |  |  |  | ● |  |  |  |
| EV first path |  |  | ● |  |  |  |  |  |  |  |  |  | Motor driving |
| EV second path 1-speed |  |  |  | ● | ● |  |  |  |  |  |  |  |  |
| EV second path 2-speed |  |  |  | ● |  |  |  |  | ● |  |  |  |  |
| EV second path 3-speed |  |  |  | ● |  | ● |  |  |  |  |  |  |  |
| EV second path 4-speed |  |  |  | ● |  |  |  |  |  | ● |  |  |  |

POWER TRANSMISSION APPARATUS FOR HYBRID ELECTRIC VEHICLE

CROSS-REFERENCE TO RELATED APPLICATION

The present application claims priority of Korean Patent Application Number 10-2014-0126792 filed on Sep. 23, 2014, the entire contents of which are incorporated herein for all purposes by this reference.

BACKGROUND OF THE INVENTION

Field of the Invention

The present invention relates to a power transmission apparatus for a hybrid electric vehicle, and more particularly, to a transmission for a vehicle which may be applied to a hybrid electric vehicle so as to obtain smooth startup and quick shifting by adding a motor/generator to an automated manual transmission (AMT).

Description of the Related Art

In a vehicle, environment-friendly technology is a key on which the survival of the future vehicle industry may greatly depend, so vehicle manufacturers are devoting their efforts to the development of environment-friendly vehicles so as to meet required environmental and fuel efficiency regulations.

As such a future type of vehicle technology, there are, for example, an EV electric vehicle (EV) which uses electrical energy, a hybrid electric vehicle (HEV), and a double clutch transmission (DCT) which is configured to enhance efficiencies and conveniences.

In addition, vehicle manufacturers are trying to commercialize a technology such as an idle stop and go (ISG) device and a regenerative braking device, as a means for enhancing the efficiency of a driving force transfer system in an effort to enhance the performance of fuel efficiency while meeting exhaust gas regulations of each country.

The ISG device uses a technology for stopping the engine while the vehicle stops and for starting the engine when the vehicle starts. The regenerative braking device uses a technology for driving a generator which uses the kinetic energy of the vehicle instead of braking based on a conventional way of friction when braking and decelerating the vehicle, and for storing the generated electrical energy in a battery and then reusing such a stored electrical energy.

In addition, the hybrid electric vehicle to which the transmission of the present invention may be applied is a vehicle which uses two or more power sources, and may be combined in various ways. The hybrid electric vehicle may be formed as a hybrid type of a gasoline engine or a diesel engine which uses existing fossil fuel and a motor/generator which is driven by electrical energy.

In addition, as a transmission which may be applied to such a hybrid electric vehicle, there is, for example, a double clutch transmission (DCT). The DCT is capable of increasing efficiency and improving convenience by applying two clutches to the manual transmission structure.

Specifically, the DCT is a transmission wherein gear shifting is performed in such a way that odd-numbered gears and even-numbered gears are alternately operated using two clutches. The mechanism wherein the gear shifting of the odd-numbered gears and the even-numbered gears is alternately performed may improve a torque disconnection effect during the gear shifting of the existing manual transmission (MT) and the automated manual transmission (AMT).

However, the DCT may have a lot of clutch damage and energy loss due to slipping of the clutch at the time of startup. When the vehicle starts on an incline, the vehicle may have a large backward force due to the slipping of the clutch, and thus problems may occur in terms of safety. Since it needs to make shifting quickly due to the heat capacity of the clutch, the impact during the gear shifting increases as compared with the automated transmission.

The information disclosed in this Background section is only for enhancement of understanding of the general background of the invention and should not be taken as an acknowledgement or any form of suggestion that this information forms the prior art already known to a person skilled in the art.

SUMMARY OF THE INVENTION

The present invention has been made in an effort to provide a transmission for a vehicle which may be applied to a hybrid electric vehicle by obtaining a smooth startup and quick shifting by adding a motor/generator to a structure of an automated manual transmission (ATM) and by providing a regenerative braking function and a startup charging function.

Various aspects of the present invention provide a transmission for a vehicle, including: a first input shaft which includes a first plurality of input gears each having different number of gear teeth at an outer circumferential side of a rear side of the first input shaft and is selectively connected through a first clutch to an output side of an engine; a second input shaft which includes a second plurality of input gears each having different number of gear teeth at an outer circumferential side of the second input shaft, is a hollow shaft disposed at a front side of the first input shaft without any rotational interference with the first input shaft, and is selectively connected through a second clutch to the output side of the engine; a first shifting output unit which includes a first output shaft disposed substantially in parallel with the first and second input shafts, shifts rotational driving force transferred through shifting gears selectively outer-engaging with corresponding input gears in the first and second pluralities of the input gears by a synchronizing unit and outputs the shifted rotational driving force through a first output gear; a second shifting output unit which includes a second output shaft disposed substantially in parallel with the first and second input shafts, shifts rotational driving force transferred through the shifting gears selectively outer-engaging with corresponding input gears in the first and second pluralities of the input gears by the synchronizing unit and outputs the shifted rotational driving force through a second output gear; a reverse speed idle unit which is disposed between the second input shaft and the second shifting output unit and regulates reverse speed shifting; and an electric driving force unit which is configured to selectively transfer, to the first input shaft or the second shifting output unit, rotational driving force of a motor/generator disposed at a third input shaft which is disposed coaxially with the first input shaft and at the rear side of the first input shaft.

The first input shaft may include an input gear which is related to odd-numbered speeds, and the second input shaft may include an input gear which is related to a reverse speed and even-numbered speeds.

The first plurality of the input gears disposed at the first input shaft may include a first input gear for a seventh speed, a second input gear for a first speed, a third input gear for a third speed, and a fourth input gear for a fifth speed, which are sequentially disposed from the front side to the rear side. The second plurality of the input gears disposed at the second input shaft may include a fifth input gear for a reverse speed and a second speed, and a sixth input gear for the fourth speed and a sixth speed, which are sequentially disposed from the front side to the rear side.

The first shifting output unit may include: the first output shaft disposed substantially in parallel with the first and second input shafts; the first output gear which is fixedly disposed at one end of the first output shaft and configured to output rotational driving force of the first output shaft; first speed and fifth speed shifting gears which are disposed at one side of the first output shaft and outer-engage with corresponding input gears of the first input shaft; a first synchronizer which is disposed between the first speed and fifth speed shifting gears and configured to selectively and synchronously connect the first speed or fifth speed shifting gear to the first output shaft; second speed and fourth speed shifting gears which are disposed at the other side of the first output shaft and outer-engage with corresponding input gears of the second input shaft; and a second synchronizer which is disposed between the second speed and fourth speed shifting gears and configured to selectively and synchronously connect the second speed or fourth speed shifting gear to the first output shaft.

The second shifting output unit may include: the second output shaft which is disposed substantially in parallel with the first and second input shafts; the second output gear which is fixedly disposed at one end of the second output shaft and configured to output rotational driving force of the second output shaft; third speed and seventh speed shifting gears which are disposed at one side of the second output shaft and outer-engage with corresponding input gears of the first input shaft; a third synchronizer which is disposed between the third speed and seventh speed shifting gears and configured to selectively and synchronously connect the third speed or seventh speed shifting gear to the second output shaft; a sixth speed shifting gear which outer-engages with a corresponding input gear on the second input shaft and a reverse speed shifting gear which outer-engages with the reverse speed idle unit; and a fourth synchronizer which is disposed between the sixth speed and reverse speed shifting gears and configured to selectively and synchronously connect the sixth speed or reverse speed shifting gear to the second output shaft.

The reverse speed idle unit may include: an idle shaft which is disposed substantially in parallel with the second input shaft; a reverse speed input gear which outer-engages with any one of the second plurality of the input gears of the second input shaft; and a reverse speed output gear which outer-engages with a reverse speed shifting gear on the second shifting output unit.

The electric driving force unit may include: the third input shaft which is disposed coaxially with the first input shaft and at the rear side of the first input shaft; the motor/generator which is connected to a rear end of the third input shaft; an electric vehicle driven gear which is integrally formed at a rear end on the second output shaft of the second shifting output unit; an electric vehicle driving gear which is disposed on the third input shaft without any rotational interference and outer-engages with the electric vehicle driven gear; and a fifth synchronizer which is disposed between the first input shaft and the electric vehicle driving gear and configured to selectively transfer the rotational driving force of the motor/generator to the first input shaft or the second output shaft.

The motor/generator may include a rotor which is connected to the third input shaft, and a stator which is disposed at an outer circumferential portion of the rotor and fixed at a transmission housing.

According to various aspects of the present invention, it is possible to be applied to the hybrid electric vehicle so as to implement the forward seven speeds using the rotational driving force of the engine ENG, implement the HEV mode forward four speeds using the rotational driving force of the engine ENG and the motor/generator MG, and implement the forward four speeds and the reverse speed using the rotational driving force of the motor/generator MG in the EV mode, thereby improving fuel efficiency.

In addition, smooth startup may be performed by using the engine and the motor/generator as a driving force source, and the startup may be performed using only the motor/generator in a state where the connection between the engine and the transmission is disconnected, thereby achieving smooth startup.

Further, when the vehicle is driven using the rotational driving force of the engine, acceleration performance may be improved because the rotational driving force of the motor/generator may be used as an auxiliary driving force.

DETAILED DESCRIPTION OF THE EMBODIMENTS

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

However, the drawings and description are to be regarded as illustrative in nature and not restrictive. Like reference numerals designate like elements throughout the specification. In the following description, some components are differentiated by naming them using the terms first, second, etc. because the names of the components are the same or similar, but such a sequence is not limited thereto.

Figure 1:
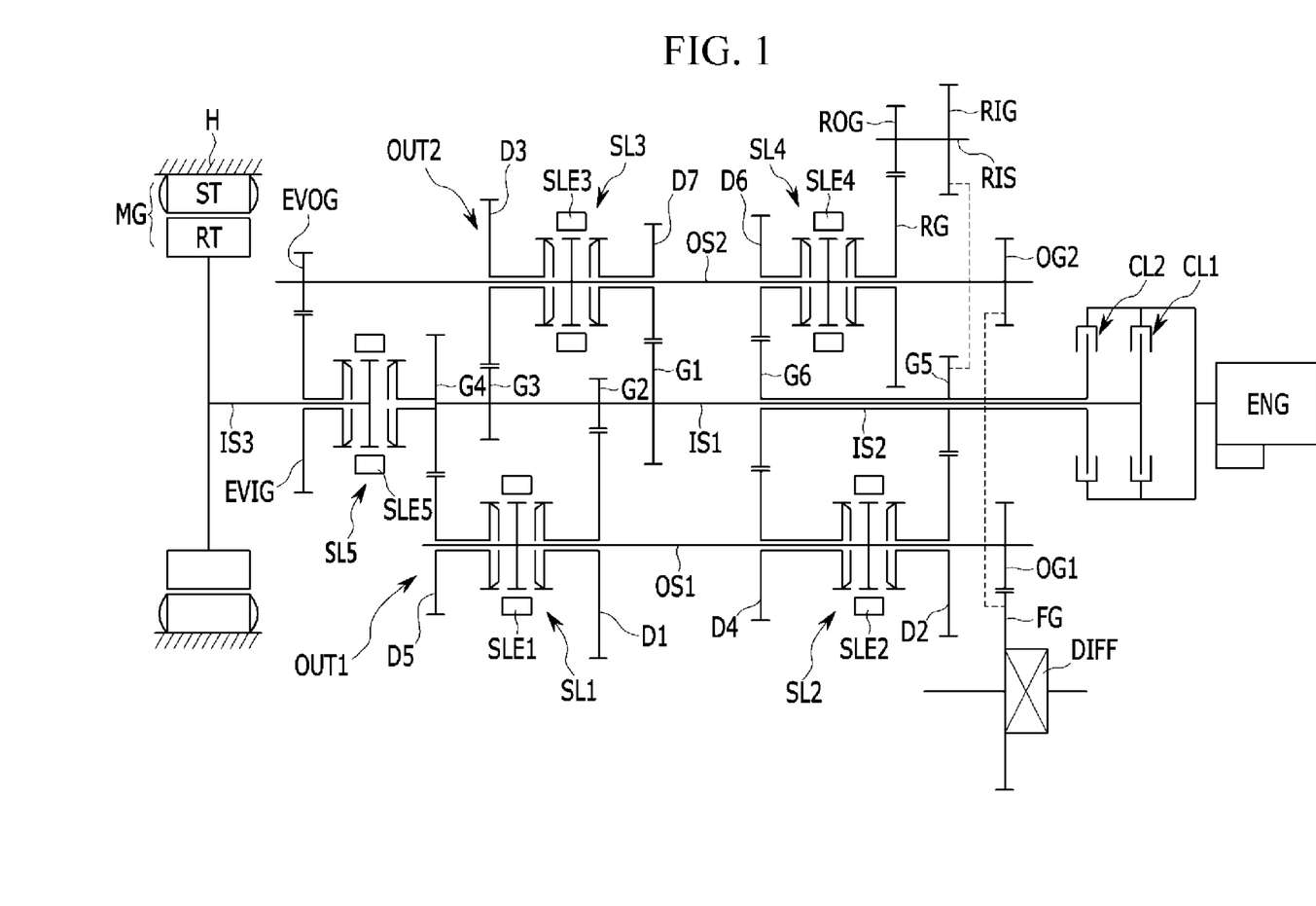
FIG. 1 is a schematic view illustrating an exemplary transmission according to the present invention.

FIG. 1 is a schematic view illustrating a transmission according to various embodiments of the present invention. Referring to FIG. 1, the transmission according to various embodiments of the present invention includes first and second input shafts IS1 and IS2, first and second clutches CL1 and CL2, first and second shifting output units OUT1 and OUT2, a reverse speed idle unit, and an electric driving force unit or means.

The first input shaft IS1 is formed as a solid shaft and is selectively connected through the first clutch CL1 to an output side of an engine ENG, and the second input shaft IS2 is formed as a hollow shaft overlapping with an outer circumferential side of the first input shaft IS1 without inter-rotational interference, and is selectively connected through the second clutch CL2 to the output side of the engine ENG.

At the first input shaft IS1, first, second, third and fourth input gears G1, G2, G3, and G4 each having different numbers of gear teeth are disposed at predetermined intervals, the gears are disposed at the rear side which passes through the second input shaft IS2, and the first, second, third and fourth input gears G1, G2, G3, and G4 are sequentially disposed from the front side.

At the second input shaft IS2, fifth and sixth gears G5 and G6 each having different numbers of gear teeth are disposed at predetermined intervals, and the gears are disposed in such a way that the fifth and sixth input gears G5 and G6 are sequentially disposed from the front side.

Therefore, when the first clutch CL1 operates, the first input shaft IS1 rotates and drives the first, second, third, and fourth input gears G1, G2, G3, and G4, and when the second clutch CL2 operates, the second input shaft IS2 rotates and drives the fifth and sixth input gears G5 and G6.

The above-described first, second, third, fourth, fifth, and sixth input gears G1, G2, G3, G4, G5, and G6 are input gears configured for implementing shifting speeds, so the number of gear teeth is determined in consideration of the number of gear teeth of each shifting speed.

The number of gear teeth is set so that the first input gear G1 may operate as an input gear for a seventh speed, the second input gear G2 may operate as an input gear for a first speed, the third input gear G3 may operate at an input gear for a third speed, the fourth input gear G4 may operate as an input gear for a fifth speed, the fifth input gear G5 may operate as an input gear for a reverse speed and a second speed, and the sixth input gear G6 may operate as an input gear for a fourth speed and a sixth speed, respectively.

That is, input gears for odd-numbered speeds are disposed at the first input shaft IS1, and input gears for even-numbered speeds are disposed at the second input shaft IS2.

Each of the first and second clutches CL1 and CL2 is formed of a typical fluid multi-plate clutch, and operations and non-operations of the first and second clutches CL1 and CL2 are controlled by a hydraulic control system.

In the first shifting output unit OUT1, a first output shaft OS1 is disposed at a predetermined distance from the first and second input shafts IS1 and IS2 in parallel or substantially in parallel, and a first output gear OG1 is fixedly disposed at one end of the first output shaft OS1 so as to output a rotational driving force of the first output shaft OS1.

A first speed shifting gear D1 and a fifth speed shifting gear D5 outer-engaging with of the second input gear G2 and the fourth input gear G4 on the first input shaft OS1 are disposed at one side of the first output shaft OS1 without any rotational interference, respectively, and a first synchronizer SL1 is disposed between the first and fifth speed shifting gears D1 and D5 to selectively and synchronously connect the first or fifth speed shifting gear D1 or D5 to the first output shaft OS1.

A second speed shifting gear D2 and a fourth speed shifting gear D4 outer-engaging with the fifth input gear G5 and the sixth input gear G6 on the second input shaft OS2 are disposed at the other side of the first output shaft OS1 without any rotational interference, respectively, and a second synchronizer SL2 is disposed between the second and fourth speed shifting gears D2 and D4 to selectively and synchronously connect the second or fourth speed shifting gear D2 or D4 to the first output shaft OS1.

At this time, the first synchronizer SL1 is disposed at the rear side of the first output shaft OS1 together with the first or fifth speed shifting gear D1 or D5, and the second synchronizer SL2 is disposed at the front side of the first output shaft OS1 together with the second or fourth speed shifting gear D2 or D4.

As such, the rotational driving force shifted by the first shifting output unit OUT1 is transferred to a differential DIFF through a final reduction gear FG which is outer-engaging with the first output gear OG1 disposed at the front end of the first output shaft OS1.

In the second shifting output unit OUT2, a second output shaft OS2 is disposed at a predetermined distance from the first and second input shafts IS1 and IS2 in parallel or substantially in parallel, and a second output gear OG2 outputting a rotational driving force of the second output shaft OS2 is fixedly disposed at one end of the second output shaft OS2.

A third speed shifting gear D3 and a seventh speed shifting gear D7 outer-engaging with the third input gear G3 and the first input gear G1 of the first input shaft OS1 are disposed at one side of the second output shaft OS2 without any rotational interference, respectively, and a third synchronizer SL3 is disposed between the third and seventh speed shifting gears D3 and D7 to selectively and synchronously connect the third or seventh speed shifting gear D3 or D7 to the second output shaft OS2.

At the other end of the second output shaft OS2, a sixth speed shifting gear D6 outer-engaging with the sixth input gear G6 of the second input shaft OS2 and a reverse speed shifting gear RG outer-engaging with the reverse speed idle unit are disposed without any rotational interference, and a fourth synchronizer SL4 is disposed between the sixth speed and the reverse speed shifting gear D6 and RG to selectively and synchronously connect the sixth speed or reverse speed shifting gears D6 or RG to the second output shaft OS2.

At this time, the third synchronizer SL3 is disposed at the rear side of the second output shaft OS2 together with the third or seventh speed shifting gear D3 or D7, and the fourth synchronizer SL4 is disposed at the front side of the second output shaft OS2 together with the sixth speed or reverse speed shifting gear D6 or RG.

As such, the rotational driving force shifted through the second shifting output unit OUT2 is transferred to the differential DIFF through the final reduction gear FG outer-engaging with the second output gear OG2 engaged at the front end of the second output shaft OS2.

The first, second, third, and fourth synchronizers SL1 to SL4 are known configurations, so the detailed descriptions thereof will be omitted, each of sleeves SLE1, SLE2, SLE3, and SLE4 applied to the first, second, third, and fourth synchronizers SL1 to SL4 additionally includes an actuator like the related art, and the actuator is controlled by a transmission control unit to thereby perform shifting.

In addition, in the reverse speed idle unit, an idle shaft RIS is disposed in parallel or substantially in parallel with the second input shaft IS2, and a reverse speed input gear RIG outer-engaging with the fifth input gear 5 is fixedly disposed at one side of the idle shaft RIS, while a reverse speed output gear ROG outer-engaging with the reverse speed shifting gear RG is fixedly disposed at the other side of the idle shaft RIS.

Therefore, the rotational driving force is transferred to the reverse speed shifting gear RG in the same direction as the fifth input gear G5 of the second input shaft IS2, so that the reverse speed may be performed.

Meanwhile, the electric driving force unit or means includes a third input shaft IS3, a motor/generator MG, an electric vehicle driven gear EVOG, an electric vehicle driving gear EVIG, and a fifth synchronizer SL5.

First, a third input shaft IS3 is disposed on the same axial line at the rear side of the first input shaft IS1.

A motor/generator MG is directly connected in a radius direction to the rear end of the third input shaft IS3.

The electric vehicle driven gear EVOG is integrally disposed at the rear end of the second output shaft OS2 of the second shifting output unit OUT2, and the electric vehicle driving gear EVIG outer-engages with the electric vehicle driven gear EVOG while being disposed on the third input shaft IS3 without any rotational interference.

Further, a fifth synchronizer SL5 is disposed between the first input shaft IS1 and the electric vehicle driving gear EVIG, so that the rotational driving force of the motor/generator MG is selectively transferred to the first input shaft IS1 or the second output shaft OS2.

The motor/generator MG performs the functions of a motor and a generator, and includes a rotor RT which is integrally connected to the third input shaft IS3 and a stator ST which is fixed to a transmission housing H at an outer side in a radius direction of the rotor T.

Therefore, the motor/generator MG performs a function of the generator by the rotational driving force of the engine ENG and stores the generated electrical energy in a battery, or performs a function of the motor which generates a driving force for driving the vehicle.

The fifth synchronizer SL5 is formed of a typical synchronizer which is disposed between the first input shaft IS1 and the third input shaft IS3 and selectively and synchronously connects the third input shaft IS3 to the first input shaft IS1 or is disposed on the third input shaft IS3 without any rotational interference to thereby be constantly connected to the third input shaft IS3, and the electric vehicle driving gear EVIG which outer-engages with the electric vehicle driven gear EVOG which is integrally formed at the second output shaft OS2 of the second shifting output unit OUT2.

Since the fifth synchronizer SL5 is a known configuration, the detailed description thereof will be omitted. A sleeve SLE5 adapted to the fifth synchronizer SL5 includes an additional actuator like the related art, and the actuator is controlled by the transmission control unit.

Here, the fifth synchronizer SL5 is not limited to the synchronizer, and any of a dog clutch, a hydraulic multi-plate clutch, and the like which may be automatically controlled may be adopted.

Figure 2:
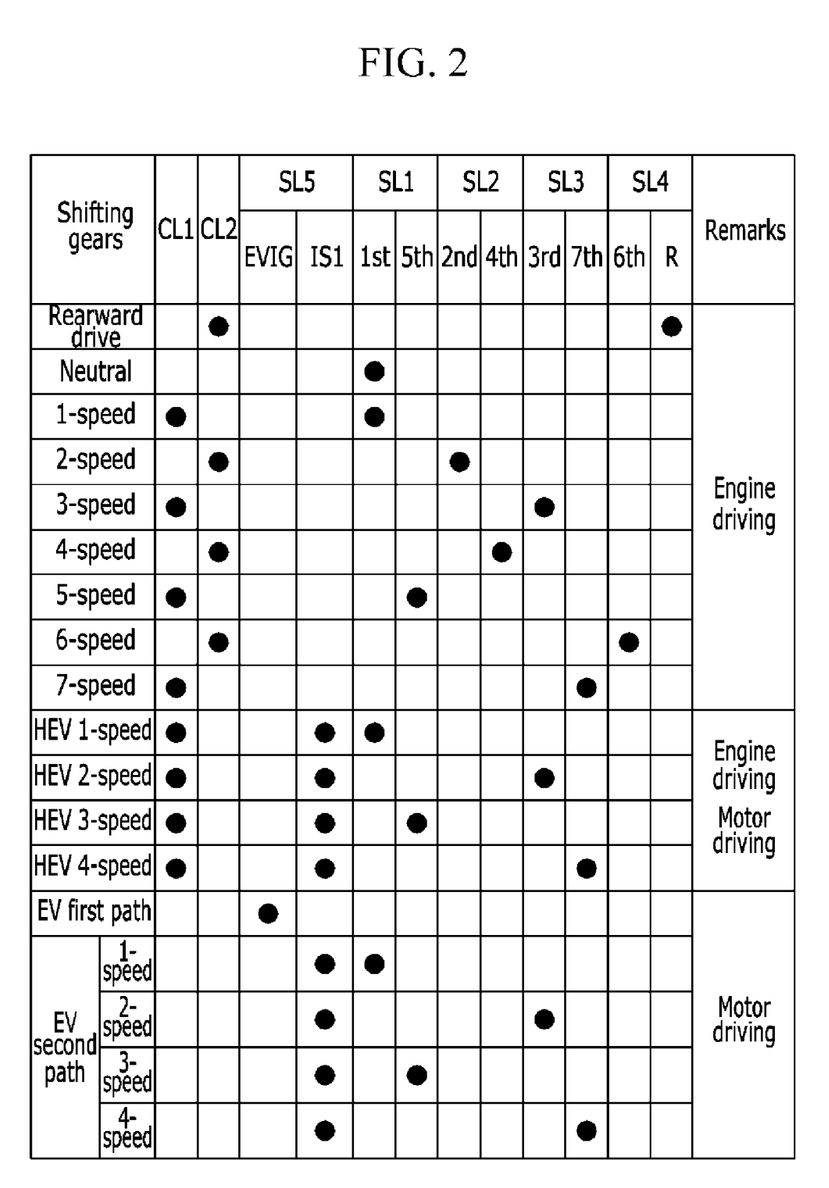
FIG. 2 is an operation table illustrating gear shifting of an exemplary transmission according to the present invention.

FIG. 2 is an operation table of gear shifting of the transmission according to various embodiments of the present invention. The gear shifting procedures will be described.

Reverse Speed

At a reverse speed, in a state where the engine ENG is started, the second output shaft OS2 and the reverse speed shifting gear RG are connected to each other through a fourth sleeve SLE4 of the fourth synchronizer SL4, and when the second clutch CL2 is actuated, the reverse speed shifting is completed.

Therefore, the rotational driving force of the engine ENG is transferred to the final reduction gear FG through the second clutch CL2, the second input shaft IS2, the first input gear G1, the reverse speed input gear RIG, the idle shaft RIS, the rearward output gear ROG, the reverse speed shifting gear RG, the second output shaft OS2, and the second output gear OG2, thereby completing the reverse speed.

Forward First Speed

At the forward first speed, the driving is performed by the rotational driving force of the engine ENG, and the first speed shifting gear D1 and the first output haft IS1 are connected to each other through the first sleeve SLE1 of the first synchronizer SL1, and when the operation of the first clutch CL1 is controlled, the first speed shifting is performed.

Therefore, the rotational driving force of the engine ENG is transferred to the final reduction gear FG through the first clutch CL1, the first input shaft IS1, the second input gear G2, the first speed shifting gear D1, the first output shaft OS1, and the first output gear OG1 to thereby complete the forward first speed driving.

In addition, after the forward first speed shifting is completed in the above way, the second speed shifting gear D2 and the first output shaft OS1 are synchronously connected to each other through the sleeve SLE2 of the second synchronizer SL2 for the next forward second speed shifting.

Forward Second Speed

In the first speed state, when the vehicle speed increases and it needs to shift to the second speed, the operation of the first clutch CL1 is released in a state of the first speed, and the operation of the second clutch CL2 is controlled.

Then, since the second speed shifting gear D2 and the first output shaft OS1 have already been connected to each other through the second sleeve SLE2 of the second synchronizer SL2 by a pre-operation in the forward first speed state, the rotational driving force of the engine ENG is naturally transferred to the final reduction gear FG through the second clutch CL2, the second input shaft IS2, the fifth input gear G5, the second speed shifting gear D2, the first output shaft OS1, and the first output gear OG1, thereby completing the forward second speed operation.

In addition, after the forward second speed shifting is completed in such a way, the first sleeve SLE1 of the first synchronizer SL1 is controlled to the neutral state, and the third speed shifting gear D3 and the second output shaft OS2 are synchronously connected to each other through the third sleeve SLE3 of the third synchronizer SL3 for the next forward third speed shifting.

Forward Third Speed

In the second speed state, when the vehicle speed increases and it needs to shift to the third speed, the operation of the second clutch CL2 is released in a state of the second speed, and the operation of the first clutch CL1 is controlled.

Then, since the third speed shifting gear D3 and the second output shaft OS2 have already been connected to each other through the third sleeve SLE3 of the third synchronizer SL3 by a pre-operation in the forward second speed state, the rotational driving force of the engine ENG is naturally transferred to the final reduction gear FG through the first clutch CL1, the first input shaft IS1, the third input gear G3, the third speed shifting gear D3, the second output shaft OS2 and the second output gear OG2, to thereby complete the forward third speed operation.

In addition, after the forward third speed shifting is completed in such a way, the second sleeve SLE2 of the second synchronizer SL2 is controlled to the neutral state, and the fourth speed shifting gear D4 and the first output shaft OS1 are synchronously connected to each other through the second sleeve SLE2 of the second synchronizer SL2 for the next forward fourth speed shifting.

Forward Fourth Speed

In the third speed state, when the vehicle speed increases, and it needs to shift to the fourth speed, the operation of the first clutch CL1 is released in a state of the third speed, and the operation of the second clutch CL2 is controlled.

Then, since the fourth speed shifting gear D4 and the first output shaft OS1 have already been connected to each other through the second sleeve (SL2) of the second synchronizer (SL2) by a pre-operation in the forward third speed state, the rotational driving force of the engine ENG is naturally transferred to the final reduction gear FG through the second clutch CL2, the second input shaft IS2, the sixth input gear G6, the fourth speed shifting gear D4, the first output shaft OS1, and the first output gear OG1, to thereby complete the forward fourth speed operation.

In addition, after the forward fourth speed shifting is completed in such a way, the third sleeve SLE3 of the third synchronizer SL3 is controlled to the neutral state, and the fifth speed shifting gear D5 and the first output shaft OS1 are synchronously connected to each other through the first sleeve SLE1 of the first synchronizer SL1 for the next forward fifth speed shifting.

Forward Fifth Speed

In the fourth speed, when the vehicle speed increases and it needs to shift to the fifth speed, the operation of the second clutch CL2 is released in a state of the fourth speed, and the operation of the first clutch CL1 is controlled.

Then, since the fifth speed shifting gear D5 and the first output shaft OS1 have already been connected to each other through the first sleeve SLE1 of the first synchronizer SL1 by a pre-operation in a state of the forward fourth speed, the rotational driving force of the engine ENG is naturally transferred to the final reduction gear FG through the first clutch CL1, the first input shaft IS1, the fourth input gear G4, the fifth speed shifting gear D5, the first output shaft OS1, and the first output gear OG1, to thereby complete the forward fifth speed operation.

In addition, after the forward fifth speed shifting is completed in such a way, the second sleeve SLE2 of the second synchronizer SL2 is controlled to the neutral state, and the sixth speed shifting gear D6 and the second output shaft OS2 are synchronously connected to each other through the fourth sleeve SLE4 of the fourth synchronizer SL4 for the next forward sixth speed shifting.

Forward Sixth Speed

In the fifth speed state, when the vehicle speed increases and it needs to shift to the sixth speed, the operation of the first clutch CL1 is released in a state of the fifth speed, and the operation of the second clutch CL2 is controlled.

Then, since sixth speed shifting gear D6 and the second output shaft OS2 have already been connected to each other through the fourth sleeve SLE4 of the fourth synchronizer SL4 by a pre-operation in a state of the forward fifth speed, the rotational driving force of the engine ENG is naturally transferred to the final reduction gear FG through the second clutch CL2, the second input shaft IS2, the sixth input gear G6, the sixth speed shifting gear D6, the second output shaft OS2, and the second output gear OG2, thereby completing the forward sixth speed operation.

In addition, after the forward sixth speed shifting is complete in such a way, the first sleeve SLE1 of the first synchronizer SL1 is controlled to the neutral state, and the seventh speed shifting gear D7 and the second output shaft S2 are synchronously connected to each other through the third sleeve SLE3 of the third synchronizer SL3 for the next forward seventh speed shifting.

Forward Seventh Speed

In the sixth speed, when the vehicle speed increases and it needs to shift to the seventh speed, the operation of the second clutch CL2 is released in a state of the sixth speed, and the operation of the first clutch CL1 is controlled.

Then, since the seventh speed shifting gear D7 and the second output shaft OS2 have already been connected to each other through the third sleeve SLE3 of the third synchronizer SL3 by a pre-operation in a state of the forward sixth speed, the rotational driving force of the engine ENG is naturally transferred to the final reduction gear FG through the first clutch CL1, the first input shaft IS1, the first input gear G1, the seventh speed shifting gear D7, the second output shaft OS2, and the second output gear OG2, thereby completing the forward seventh speed operation.

In addition, after the forward seventh speed shifting is completed in such a way, the fourth sleeve SLE4 of the fourth synchronizer SL4 is controlled to the neutral state.

The above shifting procedure has been described with an example wherein the shift-speed sequentially ascends, and when the shift-speed sequentially descends, the shifting procedure is performed in the reverse sequence of the above sequence.

In such a shifting procedure, the driving force of the motor/generator MG may be used as an auxiliary driving force of the engine ENG, and when the vehicle is driven by the rotational driving force of the engine ENG, since the rotor RT of the motor/generator MG is always rotating at the odd-numbered speed, electrical energy may be generated and charged in the battery while the motor/generator MG operates as the generator.

In addition, the transmission according to various embodiments of the present invention may be shifted to the forward fourth speed in an HEV mode.

In the HEV mode, the reason is that the shift-speed to the third input shaft IS3 may be shifted by driving both the engine ENG and the motor/generator MG.

Therefore, the forward first speed is shifted to an HEV first speed, the forward third speed is shifted to an HEV second speed, the forward fifth speed is shifted to an HEV third speed, and the forward seventh speed is shifted to an HEV fourth speed. At this time, the operation is controlled so that the first clutch CL1 operates, and at the same time, the fifth synchronizer SL5 connects the first input shaft IS1 and the third input shaft IS3.

As such, the operation may become possible in the HEV mode while the driving force is transferred to the first input shaft IS1 based on the difference in the torques of the rotational driving forces of the engine ENG and the motor/generator MG.

In addition, in the transmission according to various embodiments of the present invention, the rotational driving force of the motor/generator MG may be transferred up to the differential DIF through two paths in an EV mode.

The two paths may implement a continuously variable shifting EV mode through the second output shaft OS2, and a multi-range shifting EV mode through the first input shaft (IS1) and the first and second output shafts OS1 and OS2.

In the continuously variable shifting EV mode, the fifth synchronizer SL5 synchronously connects the electric vehicle driving gear EVIG to the third input shaft IS3 to thereby transfer the rotational driving force of the motor/generator MG to the second output shaft OS2 through the electric vehicle driven gear EVOG outer-engaging with the electric vehicle driving gear EVIG.

At this time, when the motor/generator MG rotates forward, the rotational driving force of the motor/generator MG is transferred to the differential DIF through the third input shaft IS2, the fifth synchronizer SL5, the electric vehicle driving gear EVIG, the electric vehicle driven gear EVOG, the second output shaft OS2, the second output gear OG2, and the final reduction gear FD, thereby performing the continuously variable shifting operation of the EV mode. In addition, when the motor/generator MG is driven in the reverse direction in the operation state of the fifth synchronizer SL5, the reverse speed shifting is also possible.

Further, when it needs to convert the continuously variable shifting EV mode into the HEV mode by driving the engine ENG, the first clutch CL1 is operated after the speed is shifted to the forward third speed using the third synchronizer SL3, so that the engine ENG may start.

In the multi-range fixed shifting EV mode, when the motor/generator MG is generated in a state where the fifth synchronizer SL5 connects the third input shaft IS3 and the first input shaft IS1, the rotational driving force of the motor/generator MG is transferred to the first input shaft IS1.

Therefore, when the forward first, third, fifth, and seventh shifting of the odd-numbered speeds are performed using the first and third synchronizers SL1 and SL3 of the first and second shifting output units OUT1 and OUT2, the fixed shifting may be performed in the EV mode.

As such, in such a fixed shifting EV mode, the forward first speed may be shifted to the EV first speed, the forward third speed may be shifted to the EV second speed, the forward fifth speed may be shifted to the EV third speed, and the forward seventh speed may be shifted to the EV fourth speed.

In addition, when it needs to convert the multi-range fixed shifting EV mode into the HEV mode by driving the engine ENG, the engine ENG may be started by operating the first clutch CL1 at any shift-speed.

The above-described EV shifting mode, however, has been described to show that the EV shifting mode may be implemented for the structure of the transmission according to various embodiments of the present invention, and how such an EV shifting mode is implemented may differ depending on the characteristics of the adopted vehicle.

In addition, the idle charging may be performed at the transmission according to various embodiments of the present invention when the operation of the first clutch CL1 is controlled in a state where the engine ENG is started and the fifth synchronizer SL5 is operated to connect the first input shaft IS1 and the third input shaft IS3.

In addition, the creep idle charging may also be performed when the operation of the first clutch CL1 is controlled during forward second speed creep driving in a state where a state of charge (SOC) is low and the fifth synchronizer SL5 is operated to connect the first input shaft IS1 and the third input shaft IS3.

Further, the generative braking is also possible because both the differential DIFF and the motor/generator MG are mechanically connected in the continuously variable and multi-range fixed shifting EV modes.

As described above, the transmission for a vehicle according to various embodiments of the present invention may implement the forward seven speeds using the rotational driving force of the engine ENG, implement the HEV mode forward four speeds using the rotational driving force of the engine ENG and the motor/generator MG, and implement the forward four speeds and reverse speed using the rotational driving force of the motor/generator MG in the EV mode, thereby improving fuel efficiency.

Further, smooth startup may be performed by the motor/generator MG, and the startup may be performed using only the motor/generator MG in a state where the connection between the engine ENG and the transmission is disconnected.

In addition, when the vehicle is driven by the rotational driving force of the engine ENG, acceleration performance may be improved because the rotational driving force of the motor/generator MG may be used as an auxiliary driving force.

For convenience in explanation and accurate definition in the appended claims, the terms "front" or "rear", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A transmission for a vehicle, comprising:
   a first input shaft which includes a first plurality of input gears each having different number of gear teeth at an outer circumferential side of a rear side of the first input shaft and is selectively connected through a first clutch to an output side of an engine;
   a second input shaft which includes a second plurality of input gears each having different number of gear teeth at an outer circumferential side of the second input shaft, is a hollow shaft disposed at a front side of the first input shaft without any rotational interference with the first input shaft, and is selectively connected through a second clutch to the output side of the engine;
   a first shifting output unit which includes a first output shaft disposed substantially in parallel with the first and second input shafts, shifts rotational driving force transferred through shifting gears selectively outer-engaging with corresponding input gears in the first and second pluralities of the input gears by a synchronizing unit and outputs the shifted rotational driving force through a first output gear;
   a second shifting output unit which includes a second output shaft disposed substantially in parallel with the first and second input shafts, shifts rotational driving force transferred through the shifting gears selectively outer-engaging with corresponding input gears in the first and second pluralities of the input gears by the synchronizing unit and outputs the shifted rotational driving force through a second output gear;
   a reverse speed idle unit which is disposed between the second input shaft and the second shifting output unit and regulates reverse speed shifting; and
   an electric driving force unit which is configured to selectively transfer, to the first input shaft or the second shifting output unit, rotational driving force of a motor/generator disposed at a third input shaft which is disposed coaxially with the first input shaft and at the rear side of the first input shaft.

2. The transmission of claim 1, wherein:
the first input shaft includes an input gear which is related to odd-numbered speeds; and
the second input shaft includes an input gear which is related to a reverse speed and even-numbered speeds.

3. The transmission of claim 1, wherein:
the first plurality of the input gears disposed on the first input shaft includes a first input gear for a seventh speed, a second input gear for a first speed, a third input gear for a third speed, and a fourth input gear for a fifth speed, which are sequentially disposed from the front side to the rear side; and
the second plurality of the input gears disposed on the second input shaft includes a fifth input gear for a reverse speed and a second speed, and a sixth input gear for a fourth speed and a sixth speed, which are sequentially disposed from the front side to the rear side.

4. The transmission of claim 1, wherein the first shifting output unit includes:
the first output shaft disposed substantially in parallel with the first and second input shafts;
the first output gear which is fixedly disposed at one end of the first output shaft and configured to output rotational driving force of the first output shaft;
first speed and fifth speed shifting gears which are disposed at one side of the first output shaft and outer-engage with corresponding input gears of the first input shaft;
a first synchronizer which is disposed between the first speed and fifth speed shifting gears and configured to selectively and synchronously connect the first speed or fifth speed shifting gear to the first output shaft;
second speed and fourth speed shifting gears which are disposed at the other side of the first output shaft and outer-engage with corresponding input gears of the second input shaft; and
a second synchronizer which is disposed between the second speed and fourth speed shifting gears and configured to selectively and synchronously connect the second speed or fourth speed shifting gear to the first output shaft.

5. The transmission of claim 1, wherein the second shifting output unit includes:
the second output shaft which is disposed substantially in parallel with the first and second input shafts;
the second output gear which is fixedly disposed at one end of the second output shaft and configured to output rotational driving force of the second output shaft;
third speed and seventh speed shifting gears which are disposed at one side on the second output shaft and outer-engage with corresponding input gears of the first input shaft;
a third synchronizer which is disposed between the third speed and seventh speed shifting gears and configured to selectively and synchronously connect the third speed or seventh speed shifting gear to the second output shaft;
a sixth speed shifting gear which outer-engages with a corresponding input gear on the second input shaft and
a reverse speed shifting gear which outer-engages with the reverse speed idle unit; and
a fourth synchronizer which is disposed between the sixth speed and reverse speed shifting gears and configured to selectively and synchronously connect the sixth speed or reverse speed shifting gear to the second output shaft.

6. The transmission of claim 1, wherein the reverse speed idle unit includes:
an idle shaft which is disposed substantially in parallel with the second input shaft;
a reverse speed input gear which outer-engages with any one of the second plurality of the input gears of the second input shaft; and
a reverse speed output gear which outer-engages with a reverse speed shifting gear on the second shifting output unit.

7. The transmission of claim 1, wherein the electric driving force unit includes:
the third input shaft which is disposed coaxially with the first input shaft and at the rear side of the first input shaft;
the motor/generator which is connected to a rear end of the third input shaft;
an electric vehicle driven gear which is integrally formed at a rear end on the second output shaft of the second shifting output unit;
an electric vehicle driving gear which is disposed on the third input shaft without any rotational interference and outer-engages with the electric vehicle driven gear; and
a fifth synchronizer which is disposed between the first input shaft and the electric vehicle driving gear and configured to selectively transfer the rotational driving force of the motor/generator to the first input shaft or the second output shaft.

8. The transmission of claim 1, wherein the motor/generator includes:
a rotor which is connected to the third input shaft; and
a stator which is disposed at an outer circumferential portion of the rotor and fixed at a transmission housing.

9. A transmission for a vehicle, comprising:
a first input shaft which includes a first plurality of input gears each having different number of gear teeth at an outer circumferential side of a rear side of the first input shaft and is selectively connected through a first clutch to an output side of an engine;
a second input shaft which includes a second plurality of input gears each having different number of gear teeth at an outer circumferential side of the second input shaft, is a hollow shaft disposed at a front side of the first input shaft without any rotational interference with the first input shaft, and is selectively connected through a second clutch to the output side of the engine;
a first shifting output unit which includes:
a first output shaft disposed substantially in parallel with the first and second input shafts;
a first output gear which is fixedly disposed at one end of the first output shaft and outputs rotational driving force of the first output shaft;
first speed and fifth speed shifting gears which are disposed at one side of the first output shaft and outer-engage with corresponding input gears of the first input shaft;
a first synchronizer which is disposed between the first speed and fifth speed shifting gears and configured to selectively and synchronously connect the first speed or fifth speed shifting gear to the first output shaft;
second speed and fourth speed shifting gears which are disposed at the other side of the first output shaft and outer-engage with corresponding input gears of the second input shaft; and
a second synchronizer which is disposed between the second speed and fourth speed shifting gears and configured to selectively and synchronously connect the second speed or fourth speed shifting gear to the first output shaft, and is configured to shift the inputted rotational driving force and output the shifted rotational driving force through the first output gear;
a second shifting output unit which includes:
- a second output shaft disposed substantially in parallel with the first and second input shafts;
- a second output gear which is fixedly disposed at one end of the second output shaft and is configured to output rotational driving force of the second output shaft;
- third speed and seventh speed shifting gears which are disposed at one side of the second output shaft and outer-engage with corresponding input gears of the first input shaft;
- a third synchronizer which is disposed between the third speed and seventh speed shifting gears and is configured to selectively and synchronously connect the third speed or seventh speed shifting gear to the second output shaft;
- a reverse speed shifting gear which is disposed at the other side of the second output shaft and outer-engages with a sixth speed shifting gear which outer-engages with the input gear of the second input shaft, and the reverse speed idle unit; and
- a fourth synchronizer which is disposed between the sixth speed and reverse speed shifting gears and is configured to selectively and synchronously connect the sixth speed or reverse speed shifting gear to the second output shaft and is configured to shift the inputted rotational driving force and output the shifted rotational driving force through the second output gear;

a reverse speed idle unit which is disposed between the second input shaft and the second shifting output unit and regulates reverse speed shifting; and
an electric driving force unit which is configured to selectively transfer, to the first input shaft or the second shifting output unit, rotational driving force of a motor/generator disposed at a third input shaft which is disposed coaxially with the first input shaft and at the rear side of the first input shaft.

10. The transmission of claim 9, wherein:
the first input shaft includes an input gear related to odd-numbered speeds; and
the second input shaft includes an input gear related to a reverse speed and even-numbered speeds.

11. The transmission of claim 9, wherein:
the first plurality of the input gears disposed on the first input shaft includes a first input gear for a seventh speed, a second input gear for a first speed, a third input gear for a third speed, and a fourth input gear for a fifth speed, which are sequentially disposed from the front side to the rear side; and
the second plurality of the input gears disposed on the second input shaft includes a fifth input gear for a reverse speed and a second speed, and a sixth input gear for a fourth speed and a sixth speed, which are sequentially disposed from the front side to the rear side.

12. The transmission of claim 9, wherein the reverse speed idle unit includes:
- an idle shaft which is disposed substantially in parallel with the second input shaft;
- a reverse speed input gear which outer-engages with any one of the second plurality of the input gears of the second input shaft; and
- a reverse speed output gear which outer-engages with the reverse speed shifting gear of the second shifting output unit.

13. The transmission of claim 9, wherein the electric driving force unit includes:
- the third input shaft which is disposed coaxially with the first input shaft and at the rear side of the first input shaft;
- the motor/generator which is connected to a rear end of the third input shaft;
- an electric vehicle driven gear which is integrally disposed at a rear end of the second output shaft of the second shifting output unit;
- an electric vehicle driving gear which is disposed on the third input shaft without any rotational interference and outer-engages with the electric vehicle driven gear; and
- a fifth synchronizer which is disposed between the first input shaft and the electric vehicle driving gear and configured to selectively transfer the rotational driving force of the motor/generator to the first input shaft or the second output shaft.

14. The transmission of claim 9, wherein the motor/generator includes:
- a rotor which is connected to the third input shaft; and
- a stator which is disposed at an outer circumferential portion of the rotor and fixed at a transmission housing.

* * * * *